United States Patent [19]
Krause et al.

[11] Patent Number: 5,091,782
[45] Date of Patent: Feb. 25, 1992

[54] APPARATUS AND METHOD FOR ADAPTIVELY COMPRESSING SUCCESSIVE BLOCKS OF DIGITAL VIDEO

[75] Inventors: Edward A. Krause, San Diego; Woo H. Paik, Encinitas, both of Calif.

[73] Assignee: General Instrument Corporation, Hatboro, Pa.

[21] Appl. No.: 507,258

[22] Filed: Apr. 9, 1990

[51] Int. Cl.⁵ .......................... H04N 7/12; H04N 7/18
[52] U.S. Cl. ..................................... 358/135; 358/136; 358/105; 382/56
[58] Field of Search ............... 358/133, 135, 136, 105; 382/56

[56] References Cited

U.S. PATENT DOCUMENTS

| | | | |
|---|---|---|---|
| 3,439,753 | 4/1969 | Mounts et al. | 325/38 |
| 4,546,386 | 10/1985 | Matsumoto et al. | 358/136 |
| 4,651,206 | 3/1987 | Ohki | 358/136 |
| 4,707,738 | 11/1987 | Ferre et al. | 358/135 |
| 4,802,006 | 1/1989 | Iinuma et al. | 358/135 |
| 4,816,906 | 3/1989 | Kummerfeldt et al. | 358/136 |
| 4,827,340 | 5/1989 | Pirsch | 358/136 |
| 4,837,618 | 6/1989 | Hatori et al. | 358/135 |
| 4,862,264 | 8/1989 | Wells et al. | 358/138 |
| 4,887,156 | 12/1989 | Ohki | 358/133 |
| 4,897,720 | 1/1990 | Wu et al. | 358/136 |
| 4,933,759 | 6/1990 | Van der Meer et al. | 358/105 |
| 4,962,465 | 7/1990 | Ohta | 358/133 |
| 4,984,076 | 1/1991 | Watanabe et al. | 358/133 |

FOREIGN PATENT DOCUMENTS 0105604 4/1984 European Pat. Off.
0237989 9/1987 European Pat. Off.

OTHER PUBLICATIONS

"Scene Adaptive Coder", Chen and Pratt, *IEEE Transactions on Communications*, vol. COM-32, No. 3, Mar. 1984.
"Fixed and Adaptive Predictors for Hybrid Predictive/Transform Coding", Ericsson, *IEEE Transactions on Communications*, vol. COM-33, No. 12, Dec. 1985.
"A Motion-Compensated Interframe Coding Scheme for Television Pictures", Ninomiya and Ohtsuka, *IEEE Transactions on Communications*, vol. COM-30, No. 1, Jan. 1982.

*Primary Examiner*—John K. Peng
*Attorney, Agent, or Firm*—Barry R. Lipsitz

[57] ABSTRACT

The compression of successive blocks of digital data is optimized by selecting between different compression algorithms or different data formats on a block-by-block basis. In one application, digitized interlaced video signals are processed for transmission in a compressed form. A set of pixel data presented in a field format is compressed to provide a first compressed video signal. The set of pixel data is also presented in a frame format and compressed to provide a second compressed video signal. Errors are evaluated in the first and second compressed video signals. The compressed video signal having the least error is selected for further processing. The technique is repeated for successive sets of pixel data and the selected signals are encoded to identify them as field formatted or frame formatted signals. The encoded selected signals are then combined to provide a compressed video signal data stream for transmission. Apparatus for receiving and decoding the signals is also disclosed.

33 Claims, 8 Drawing Sheets

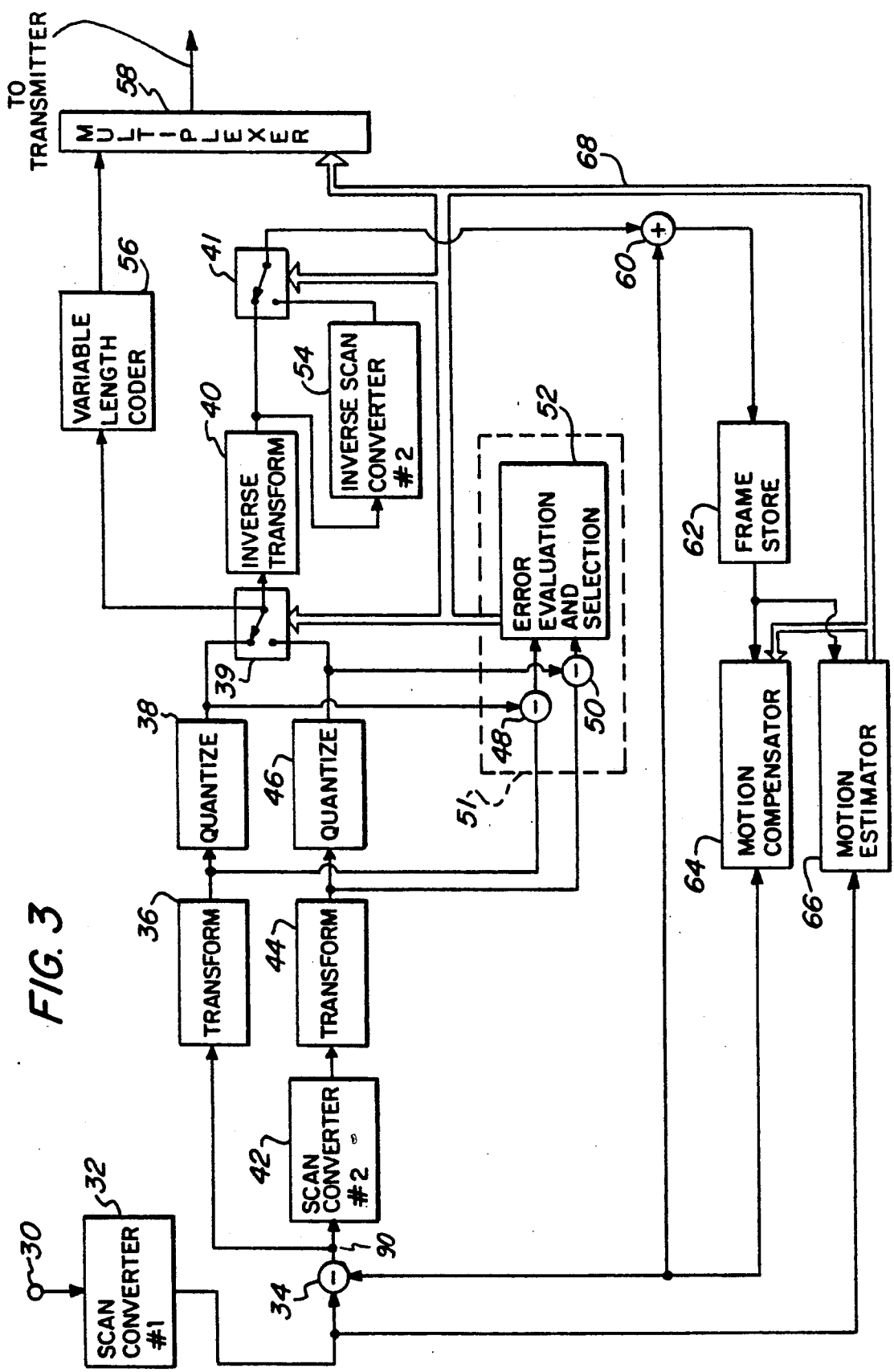

FIELD 1

| 1 | 3 | 5 | 7 | 9 | 11 | 13 | 15 |
|---|---|---|---|---|---|---|---|
| 17 | 19 | 21 | 23 | 25 | 27 | 29 | 31 |
| 33 | 35 | 37 | 39 | 41 | 43 | 45 | 47 |
| 49 | 51 | 53 | 55 | 57 | 59 | 61 | 63 |

FIELD 2

| 2 | 4 | 6 | 8 | 10 | 12 | 14 | 16 |
|---|---|---|---|---|---|---|---|
| 18 | 20 | 22 | 24 | 26 | 28 | 30 | 32 |
| 34 | 36 | 38 | 40 | 42 | 44 | 46 | 48 |
| 50 | 52 | 54 | 56 | 58 | 60 | 62 | 64 |

*FIG. 6*

APPARATUS AND METHOD FOR ADAPTIVELY COMPRESSING SUCCESSIVE BLOCKS OF DIGITAL VIDEO

BACKGROUND OF THE INVENTION

The present invention relates to the compression of digital video, and more particularly to a method and apparatus for processing digitized interlaced video signals for transmission in a compressed form.

Television signals are conventionally transmitted in analog form according to various standards adopted by particular countries. For example, the United States has adopted the standards of the National Television System Committee ("NTSC") while most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system where signals are transmitted by satellite, the television signals can be transmitted using a quadrature phase shift keyed ("QPSK") modulated data stream. A subscriber to the system receives the QPSK data stream via a receiver/descrambler which provides video, audio, and data to the subscriber. In order to most efficiently use the available radio frequency spectrum, it is advantageous to compress the digital television signals to minimize the amount of data that must be transmitted.

Video compression techniques have been used in the past for video teleconferencing and other specialized applications. Such systems are capable of very high compression ratios, but generally exhibit limited spatial resolution and poor motion rendition. This is usually a result of initial constraints imposed on the frame rate and on the horizontal and vertical sampling rates of the system. A video "frame" can be likened to one of a sequence of snapshots that together provide a moving picture. Each frame is sampled in both the horizontal and vertical direction to obtain all of the picture information contained therein.

Video compression systems are currently under development for digital transmission of existing television signals and future high definition television signals. Such television signals are significantly more complex than teleconferencing signals and are much more difficult to compress. The performance of digital compression systems in television applications is highly scene dependent. In order to succeed, a compression algorithm should be able to adapt to specific conditions to increase compressibility and to mask invariable errors in a manner that will not be perceivable to a human viewer.

Highly detailed moving objects in a television picture present the greatest challenge to a compression system. The most powerful compression systems currently available (i.e., those that achieve the greatest reduction in the amount of data necessary to define television pictures) utilize interframe processing in order to take advantage of the temporal correlation between successive frames. However, frame-to-frame correlation is reduced when there is movement. This requires more complicated processing to maintain a high degree of performance.

Video compression is further complicated with television signals since interlaced scanning is used to define a television picture. Each frame of a television picture comprises a plurality of horizontal lines (e.g., 525 lines in a standard NTSC television signal) which together form a picture. The horizontal lines are divided into even and odd fields, wherein the even lines (lines 2, 4, 6, ...) form the even field and the odd lines (lines 1, 3, 5, ...) form the odd field. The even and odd fields are scanned in an alternating order to interleave the even and odd lines and provide the picture information in a proper sequence. The use of interlaced scanning complicates the compression of television signals as compared to previous teleconferencing applications, in which the compression was not performed on an interlaced signal.

A digitized interlaced television signal can be compressed in various formats. In one format, referred to herein as the "field format", each frame is separated into its two fields which are processed independently. In another format, referred to as the "frame format", the two fields are processed as a single frame by interleaving the lines of corresponding even and odd fields. Neither option is entirely satisfactory for video compression. Frame processing works better than field processing when there is little or no motion. Since each frame has twice the number of lines or samples than a field for a given picture height, there will be more correlation between samples and hence, compressibility is increased. To achieve the same accuracy as frame processing, field processing requires a higher bit rate. Thus, for equal bit rates frame processing achieves greater accuracy.

Frame processing enjoys similar advantages over field processing if horizontally moving features have little horizontal detail or if vertically moving features have little vertical detail. In regions where there is little detail of any sort, frame processing often works better than field processing no matter how rapidly changes occur.

In detailed moving areas, it is generally more efficient to compress field formatted data. In such cases, frame processing suffers from spurious high vertical frequencies introduced by the interleaving of the even and odd fields. This reduces the correlation between lines and therefore the effectiveness of the compression algorithm.

It would be advantageous to provide a compression system that combines the advantages of frame processing where there is little or no motion with the advantages of field processing in detailed moving areas. It would be further advantageous to provide such a system that permits video signals to be compressed and then reconstructed without any degradation in motion rendition.

It would also be advantageous to provide a general purpose compression system for optimizing the compression of digital data by combining different compression techniques or data formats to obtain peak performance under different conditions. The present invention provides a method and apparatus for achieving such advantages.

SUMMARY OF THE INVENTION

In accordance with the present invention, apparatus is provided for optimizing the compression of successive blocks of digital video. The video blocks are compressed in a first data path to provide a first compressed signal and in a second data path to provide a second compressed signal. Errors in the first and second compressed signals are evaluated, and the compressed signal having the least error is selected for each video block. The selected signals are then combined to provide a compressed digital data stream.

Each selected signal is encoded with data indicative of the data path in which the signal originated. Receiver apparatus for decoding the compressed digital data stream comprises means for detecting the encoded data from each selected signal to identify whether the signal originated in the first or second data path. Means responsive to the detecting means decompresses the selected signals from the first data path in a corresponding first decompression path. Similarly, signals selected from the second data path are decompressed in a corresponding second decompression path. The first and second data paths can use different compression algorithms. Alternately, the same compression algorithm can be applied in each path to data that is provided to the paths in different formats. In either case, the first and second decompression paths will use decompression algorithms or data formats that correspond to those of the respective first and second data paths.

In a preferred embodiment, the apparatus and method of the present invention process digitized interlaced video signals for transmission in a compressed form. The transmitted compressed signals are decoded at a receiver for reconstruction of the original interlaced video signals.

A digitized interlaced video signal is divided at the transmitter into blocks of pixel data. The blocks are formatted into a field format and compressed to provide a first compressed video signal. The blocks are also formatted in a frame format and compressed to provide a second compressed video signal. Errors in the first and second compressed video signals are evaluated, and the compressed video signal having the least error is selected for each block. The selected signals are encoded to identify them as field formatted or frame formatted signals. The encoded signals are combined to provide a compressed video signal data stream for transmission.

Motion compensation can be provided to increase the compression efficiency. With motion compensation, pixel data for a current video frame contained in the digitized interlaced signal is predicted from pixel data of a previous frame. The predicted pixel data is subtracted from the actual pixel data for the current frame to provide an abbreviated set of pixel data for use in producing the first and second compressed video signals. The selected signals are encoded with motion vector data generated during the prediction step.

At a receiver, the combined and coded signals are decoded. Field formatted signals are processed in a decoder path adapted for field processing of data. Frame formatted signals are processed in a decoder path adapted for frame processing of data. The appropriate decompressed data (field processed or frame processed) for each data block is then combined.

Motion vector data is retrieved at the receiver from encoded selected signals representing a current video frame. Data representing a previous video frame is stored. Prediction signals are computed from the retrieved motion vector data and the stored data. The prediction signals are added to the decompressed signals, and the resultant signals are formatted to reconstruct the original digitized interlaced video signal.

Field formatting of data at the transmitter can be accomplished by dividing the digitized interlace video signal into even and odd blocks of pixel data corresponding to even and odd fields of a video frame. The even and odd blocks are then provided to a first compressing means in an alternating order defining the field format. Frame formatted data can be provided by grouping the blocks into corresponding odd/even block pairs, and scanning the odd and even lines of pixel data from each pair in an alternating order. The resultant interleaved lines of frame formatted data from successive block pairs are provided to a second compressing means.

One compression algorithm that may be used in connection with the present invention is the Discrete Cosine Transform ("DCT"), in which case the first and second compressing means produce and quantize respective first and second arrays of transform coefficients for the pixel data. The error evaluating means determine the error between the quantized transform coefficients and the unquantized transform coefficients of each array. The error may be computed from the difference between each coefficient in an array before and after quantization, and selection between field processed and frame processed data can be made by comparing the sum of the absolute value of all the coefficient differences in the first array to the sum of the absolute value of all the coefficient differences in the second array. The array having the least total error is chosen for transmission.

The error evaluating means can alternatively operate in the pixel domain, by inverse transforming the first and second arrays to recover the pixel data. In this case, the error for the respective field and frame processing paths is determined by comparing the pixel data recovered from each array to the original set of pixel data presented to the compression means.

BRIEF DESCRIPTION OF THE DRAWINGS

FIG. 3 is a block diagram of data compression apparatus for use at a transmitter in accordance with the present invention;

FIG. 6 is a diagram illustrating the order of individual pixel data blocks within the fields of a video frame;

DETAILED DESCRIPTION OF THE INVENTION

Figure 1:
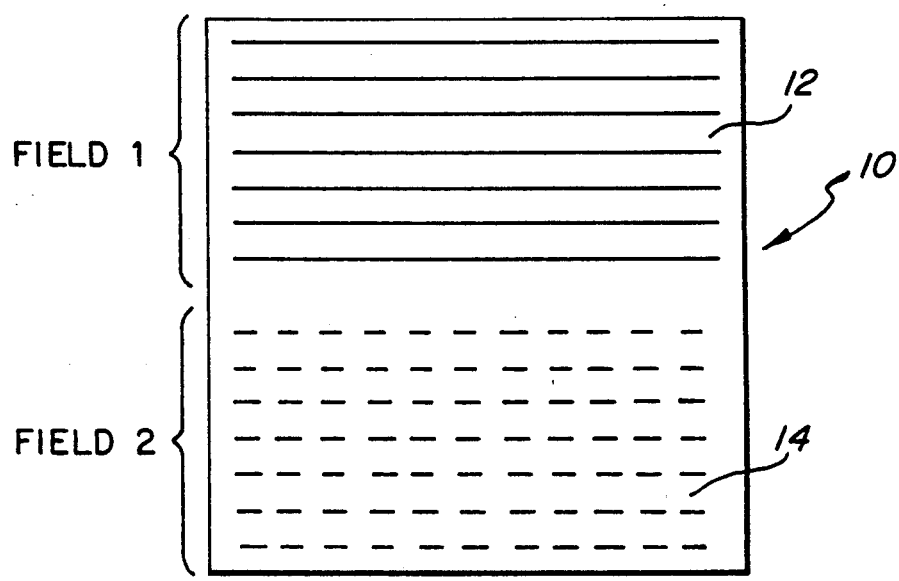
FIG. 1 is an illustration depicting a video frame separated into odd and even fields for field processing of pixel data.

FIG. 1 illustrates a single video frame 10 separated into its two component fields. Field 1 designated by reference numeral 12 comprises the odd lines of the video frame. Field 2 represented by reference numeral 14 comprises the even lines of the video frame. In prior art analog television systems, each even and odd line of the video frame is defined by an analog signal modulated with image information. Sequential lines from the even and odd fields are interleaved to provide an intelligible video picture.

Figure 2:
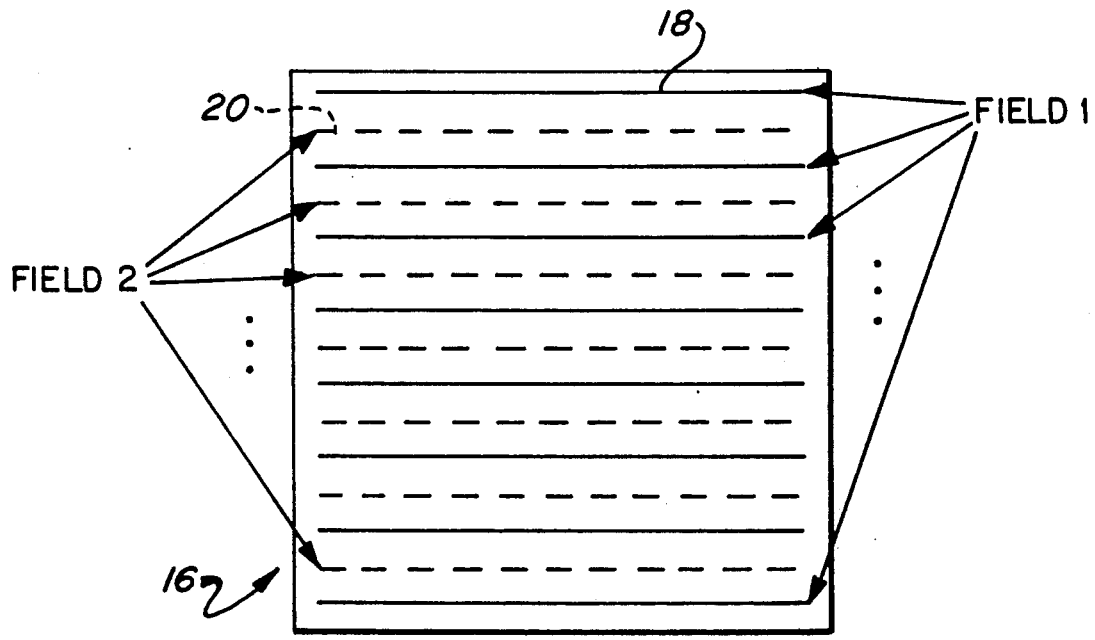
FIG. 2 is a diagram illustrating a video frame having interleaved even and odd lines for frame processing of pixel data.

An interlaced video frame 16 is depicted in FIG. 2. Odd lines 18 from Field 1 are interleaved with even lines 20 from Field 2. The even and odd lines must be interleaved in this fashion in order for a proper picture to be displayed on a television screen.

The present invention concerns digitally transmitted data. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed. As noted above, different data formatting and/or compression techniques can be more efficient than others at different times during the transmission of a digital data stream. For example, field processing of video data in a format as shown in FIG. 1 is generally preferred in detailed moving areas. Frame processing, as depicted by the format of FIG. 2, generally works better than field processing when there is little or no motion. The present invention provides a system that optimizes the compression of digital television data by switching between field processing and frame processing as appropriate.

In accordance with the present invention, a standard digitized interlaced television signal is input at terminal 30 of the data compression apparatus shown in FIG. 3. The process of digitizing video signals is well known in the art. A plurality of separate digitized signals may be provided for the various components, such as luminance and chrominance, of a video signal. When the present invention is used in conjunction with multiple luminance and chrominance components, it is most important that the luminance portion of the video signal take advantage of the adaptive field and frame processing.

An image defined by the interlaced video signal is decomposed by a first scan converter 32 into blocks of a size appropriate for data compression. Any of the various data compression techniques well known in the art can be used in accordance with the present invention. The most popular compression technique is known as the Discrete Cosine Transform ("DCT"). This technique is described in Chen and Pratt, "Scene Adaptive Coder", *IEEE Transactions on Communications*, Vol. COM-32, No. 3, March 1984, which is incorporated herein by reference. The following description explains the invention using an 8×8 pixel block size together with the DCT compression technique.

In order to minimize complexity and memory requirements for the compression and subsequent decompression apparatus of the present invention, scan converter 32 groups the even and odd fields of each video frame into pairs. The scan converter then alternately outputs the same block from one field and then the other. This function can be implemented using the components illustrated in the block diagram of FIG. 4a.

The digitized interlaced video signal input at terminal 30 is formatted to provide all of the lines from the odd field (Field 1) followed by all of the lines of the even field (Field 2). This is depicted in FIG. 4b, which illustrates Field 1 (160) followed by Field 2 (162). The function of scan converter 32 is to divide Fields 1 and 2 into a plurality of corresponding blocks. Each block is M pixels wide by N pixels high. It takes j such blocks to cover the width of the picture and i blocks to cover the height of each field. Having established this format, scan converter 32 then outputs the blocks in alternating odd/even order, as illustrated in FIG. 6.

FIG. 6 is a detailed representation of the odd and even fields 160, 162 of FIG. 4b after the image has been decomposed by scan converter 32 into individual blocks of pixel data. Field 1 comprises odd blocks of pixel data and Field 2 comprises even blocks of pixel data. In the embodiment illustrated, each 8×8 block contains 64 pixels. The first block of data output from scan converter 32 for each field pair is block 164. Next, block 200 is output, followed by blocks 165, 201, 166, 202, etc. After block 231 is output from scan converter 32, the next two fields (representing the next video frame) are processed and read out in the same manner. The formatting of data by scan converter 32 as described above is referred to herein as field formatted data.

Figure 4A:
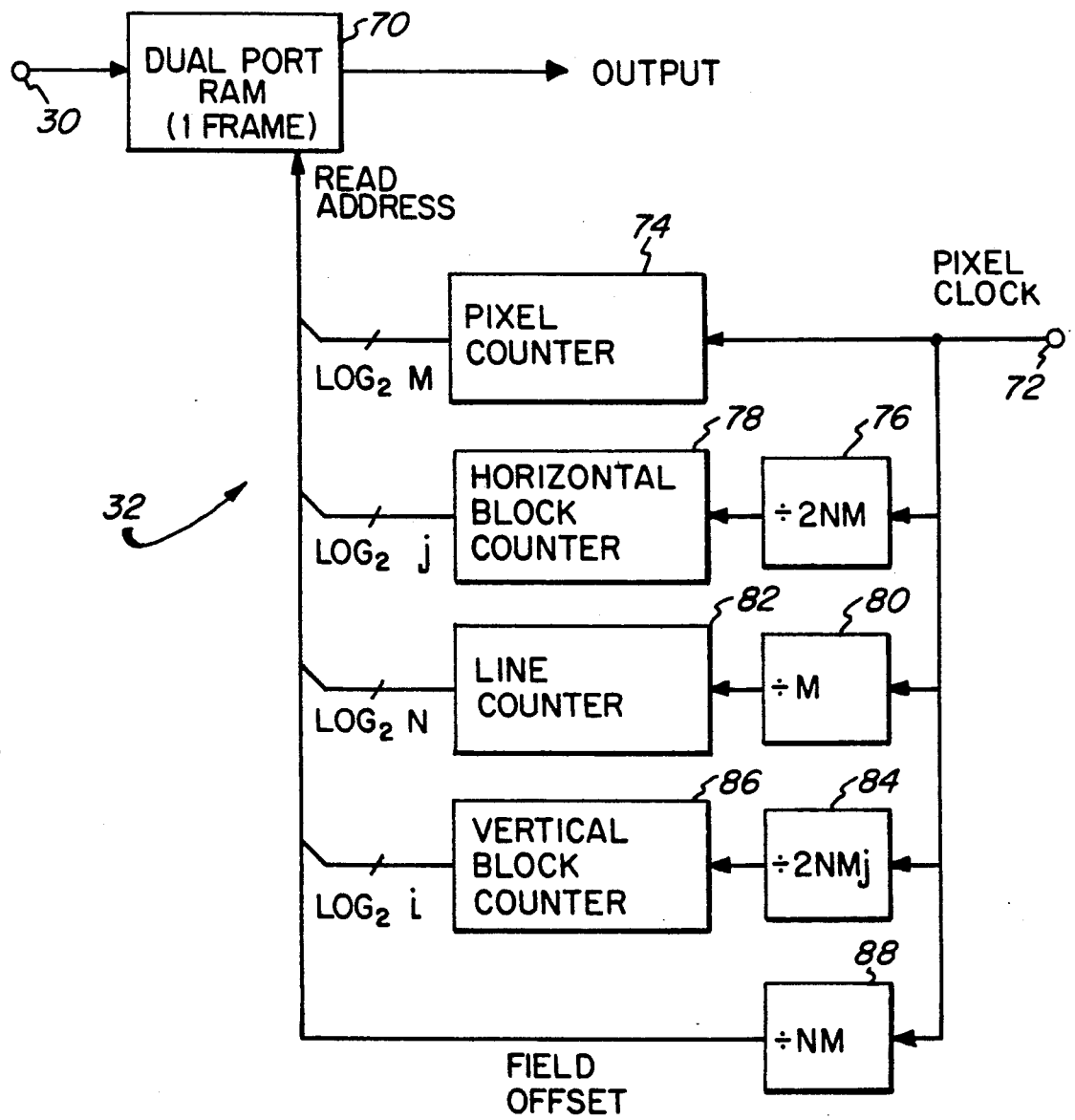
FIG. 4a is a block diagram of circuitry that can be used to perform the function of scan converter #1 of FIG. 3.
Figure 4B:
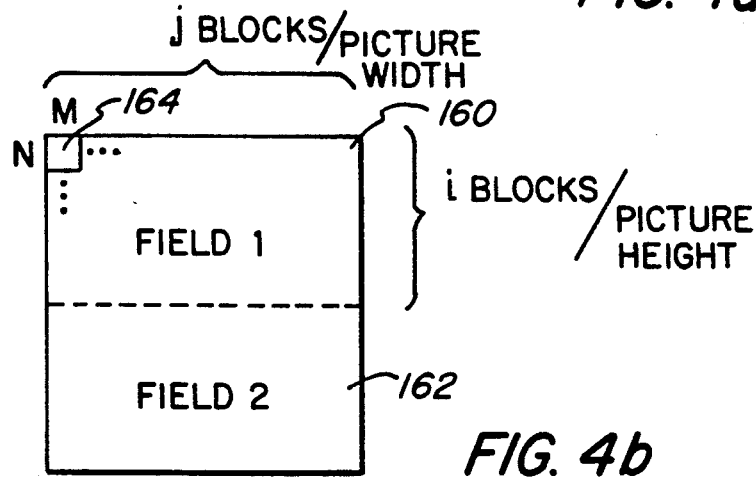
FIG. 4b is a diagram illustrating the format of pixel data blocks output from scan converter #1.

In order to provide field formatted data, scan converter 32 can comprise a dual port RAM 70 as shown in FIG. 4a. The data contained in a digitized interlaced video signal input at terminal 30 is loaded into RAM 70 in the order received. A read address is generated to enable the data to be read out of RAM 70 in the field format. A pixel clock signal input at terminal 72 is coupled to a pixel counter 74 that outputs a digital signal ranging from 0 to $M-1$. This count forms the $\log_2 M$ least significant bits of the dual port RAM read address. A divider 76 and horizontal block counter 78 produce a signal ranging from 0 to $j-1$ and forms the next $\log_2 j$ bits of the read address. Another divider circuit 80 and line counter 82 provide an output ranging from 0 to $N-1$, and forms the next $\log_2 N$ bits of the read address. Divider 84 and vertical block counter 86 provide an output ranging from 0 to $i-1$ to form the next $\log_2 i$ bits. Finally, divider 88 provides the most significant bit of the dual port RAM address in order to toggle between Field 1 and Field 2 of each video frame. The composite address signal input to RAM 70 requires $1+\log_2 M + \log_2 j + \log_2 N + \log_2 i$ bits. For an 8×8 block size, the pixel and line counters will both require 3 bits. The number of bits required for the horizontal and vertical block counters will depend on the size of the fields.

The result of the above is that the read address of RAM 70 will be incremented to output the video data in a field format. Those skilled in the art will appreciate that the pixels within each block may be scanned in a different order as determined by the input requirements of the DCT algorithm or other compression device used.

Referring again to FIG. 3, the field formatted data is output from scan converter 32 to a first compression path comprising a DCT transform coder 36 and a quantizer 38. These are conventional elements used in DCT compression, as described in the Chen and Pratt article referred to above. The field formatted data is also input to a second compression path comprising a second scan converter 42, a transform coder 44, and a quantizer 46. Transform coder 44 and quantizer 46 are identical to those in the first compression path. Prior to inputting the field formatted data to the first and second compression paths, an optional predictor signal used for motion compensation can be subtracted by a subtraction circuit 34. The motion compensation aspect of the present invention is described in more detail below.

Figure 5A:
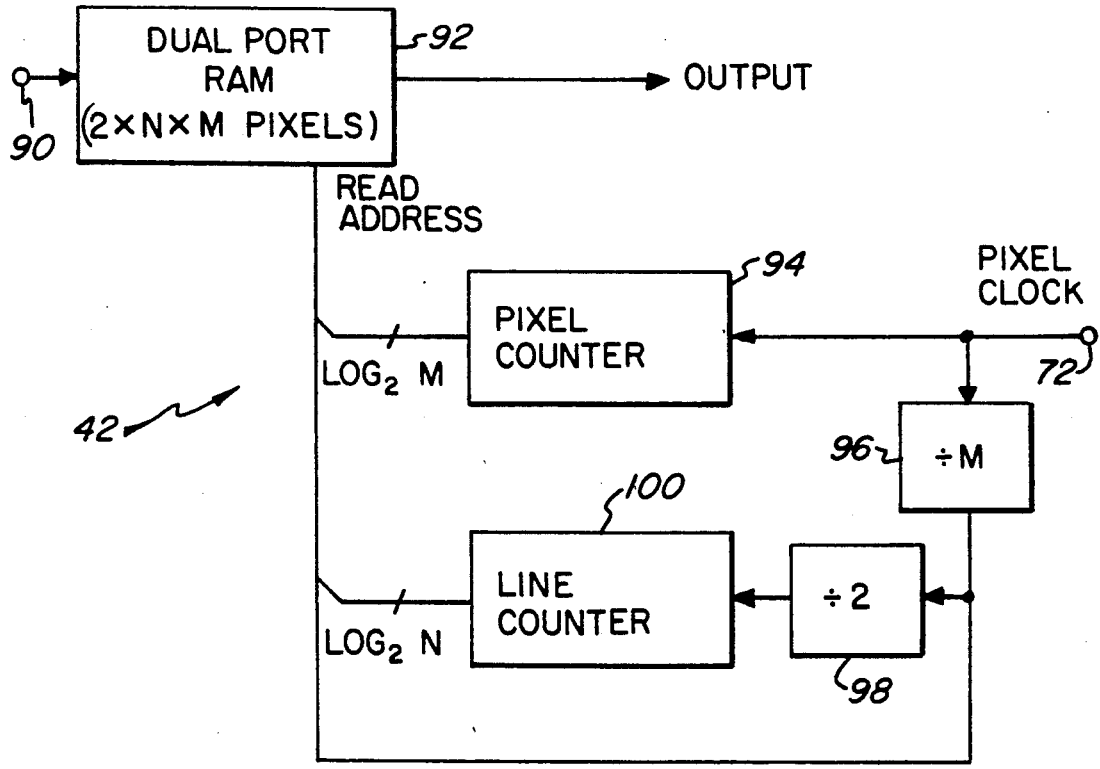
FIG. 5a is a block diagram of circuitry that can be used to perform the function of scan converter #2 of FIG. 3.
Figure 5B:
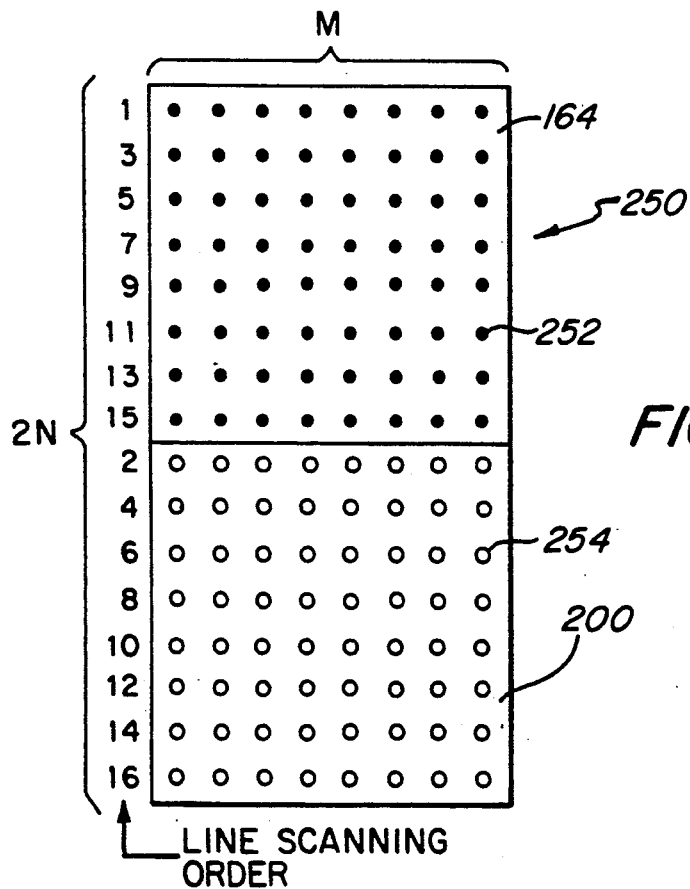
FIG. 5b is a diagram illustrating the format of an odd/even pair of pixel data blocks provided by scan converter #2.

Scan converter 42 is used to convert the field formatted data from scan converter 32 into a frame format. In this format, corresponding pairs of blocks from the even and odd fields are interleaved on a line-by-line basis. Components for performing this operation are illustrated in FIG. 5a. The frame format is illustrated in FIG. 5b, which shows a pair of vertically adjacent blocks 250 comprising odd block 164 and corresponding even block 200. These are the same blocks that are illustrated in a field format in FIG. 6. Block 164 contains 64 odd pixels 252 that represent portions of the odd lines contained in a video frame. Block 200 contains 64 even pixels 254 corresponding to portions of the even lines of the video frame.

The components of FIG. 5a scan the lines of pixels shown in FIG. 5b in an alternating odd/even line scanning order to provide the interleaved frame formatted data. The field formatted data input at terminal 90 is stored by dual port RAM 92 in the order received. The pixel clock signal input at terminal 72 of FIG. 5a is used to strobe a pixel counter 94 to provide an output signal ranging from 0 to M−1, which serves as the log$_2$M least significant bits of the dual port RAM address. The pixel clock signal is divided by M at divider 96, and input to another divide by 2 circuit 98 for input to a line counter 100. The line counter outputs a digital signal ranging from 0 to N−1 which forms the next log$_2$N bits of the dual port RAM address. The output of divide by M circuit 96 also serves as the most significant bit of the read address input of RAM 92. The resultant read address signal consists of 1+log$_2$N+log$_2$M bits. This signal causes the data stored in RAM 92 to be read out in the frame format.

As indicated in FIG. 3, the compressed field formatted data from the first compression path is output from quantizer 38 to a switch 39. The frame formatted data compressed in the second compression path is output from quantizer 46 to switch 39. In accordance with the present invention, errors in the compressed data from the two different compression paths are evaluated and the data having the least error for each odd/even block pair is selected for transmission. Thus, where a portion of a video frame having little or no motion is compressed, it is likely that the pixel data processed in the frame format will be selected. Where the portion of the video frame being evaluated is from a detailed moving area, it is probable that the data compressed in a field format will be selected.

Figure 9:
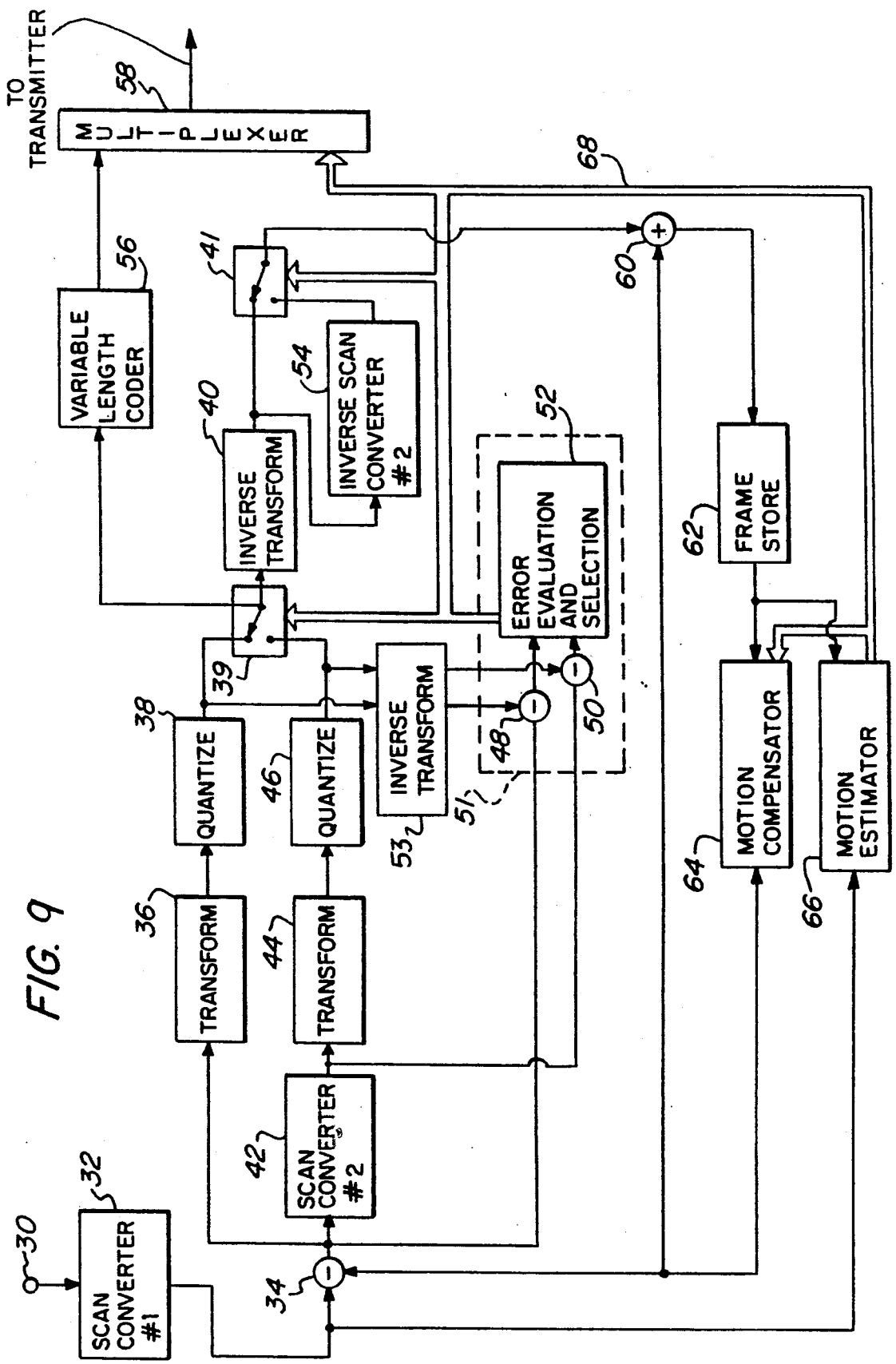
FIG. 9 is a block diagram of data compression apparatus similar to that shown in FIG. 3, but using an alternate error evaluation scheme.

Error evaluation and selection of frame processed or field processed data is achieved using hard wired logic generally designated by reference numeral 51. The error is determined by comparing the quantized transform coefficients to the original unquantized transform coefficients in each data path. The unquantized coefficients input to quantizer 38 are subtracted at 48 from the quantized coefficients output from quantizer 38. Similarly, the unquantized coefficients input to quantizer 46 are subtracted at 50 from the quantized coefficients output from quantizer 46. The results are input to an error evaluation and selection circuit 52 that compares the errors in the two paths. In an alternate embodiment illustrated in FIG. 9, an inverse transform circuit 53 is provided to recover the pixel data from quantizers 38 and 46. Error evaluation and selection circuit 52 then determines the error between the recovered pixel data and the original pixel data presented to the first and second compression paths. It should be appreciated that the error evaluation and selection could alternately be implemented in software.

In a preferred embodiment, the error metric used is the sum of the absolute value of all the coefficient differences. However, other metrics such as the mean squared error will also perform satisfactorily. In either case, the average error is evaluated over a two-block region. This is required because the frame formatted data comprises interleaved data from odd/even block pairs, as shown in FIG. 5b. Comparison of field formatted data to frame formatted data must therefore occur over the two-block region.

Figure 7:
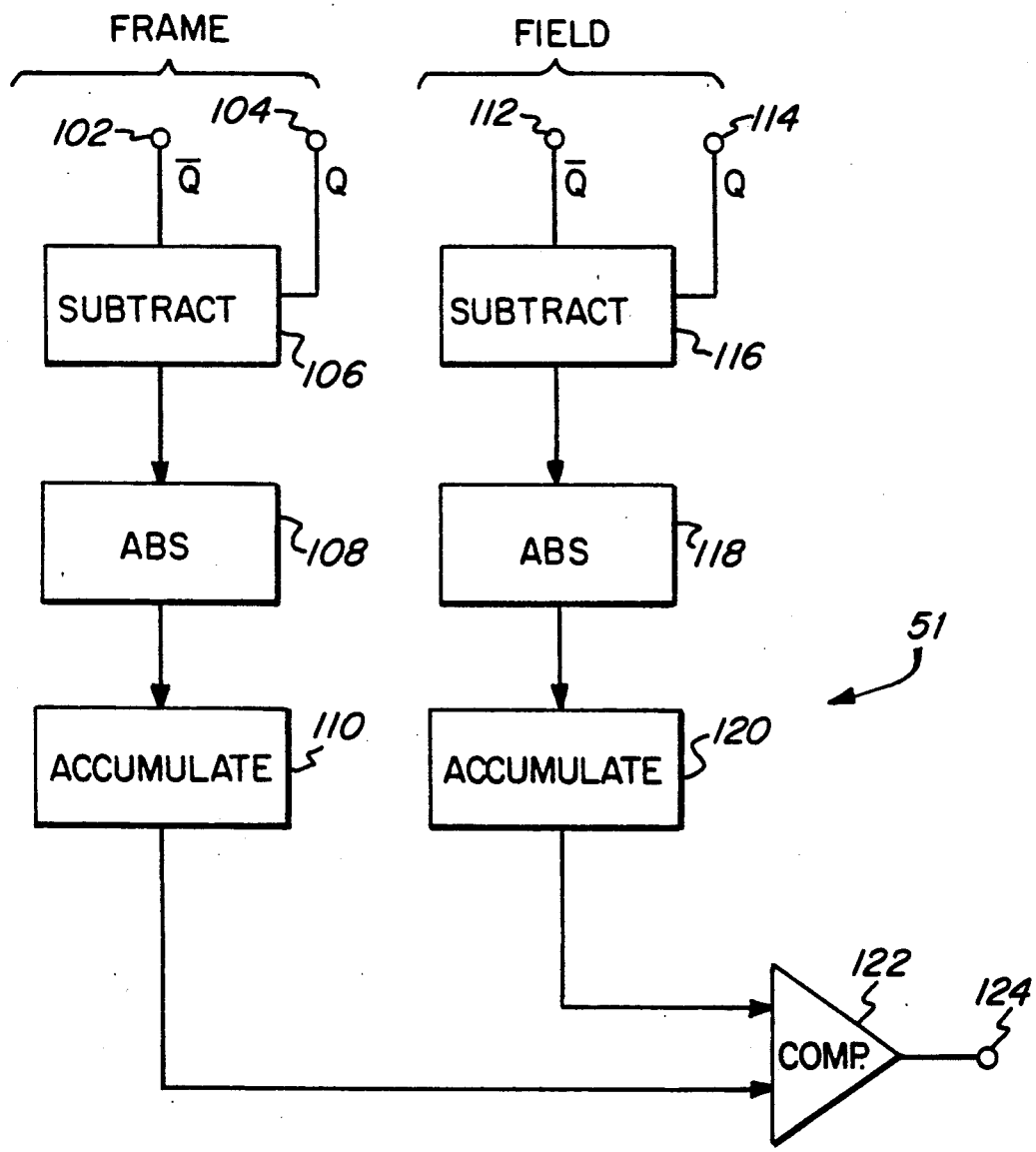
FIG. 7 is a block diagram of error evaluation and selection circuitry that can be used in the apparatus of FIG. 3.

The error evaluation and selection components 51 are illustrated in greater detail in FIG. 7. As noted, these may be implemented in hardware or software. Quantized (Q) and unquantized ($\bar{Q}$) data from the frame format compression path are input to terminals 104 and 102 respectively of subtraction circuit 106. The absolute value of the difference between these signals is determined by conventional means 108, and accumulated at 110. Similarly, the quantized and unquantized coefficients from the field format compression path are input at terminals 114, 112 respectively of subtraction circuitry 116. The absolute values of the differences are computed as indicated at 118, and accumulated at 120. The accumulated errors from the respective frame and field formatted paths are compared at a comparator 122, which provides an output signal at terminal 124 indicative of which path produced the least error for a particular pair of pixel data blocks.

The output signal from the error evaluation and selection components actuates switch 39 (FIG. 3) to connect the compression path having the least error to downstream processing circuitry. Such circuitry includes variable length coder 56 that assigns variable length codewords to represent the selected sets of quantized transform coefficients. An example of such a variable length coder is described in the Chen and Pratt article referred to above.

The output of variable length coder 56 is input to a multiplexer 58 that combines the compressed data with control data carried on data path 68. The control data includes a bit for encoding the selected compressed signals to identify them as field formatted or frame formatted signals. This can be the same bit used to actuate switch 39, wherein the selection of one of the compression paths is represented by "1" and the other compression path is represented by "0".

The adaptive field/frame encoding system shown in FIG. 3 can optionally be combined with motion compensation to provide additional compression efficiencies. Motion compensation techniques are well known in the art. Such techniques are described, for example, by Staffan Ericsson in "Fixed and Adaptive Predictors for Hybrid Predictive/Transform Coding", *IEEE Transactions on Communications,* Vol. COM-33, No. 12, December 1985, and Ninomiya and Ohtsuka, "A Motion-Compensated Interframe Coding Scheme for Television Pictures", *IEEE Transactions on Communications,* Vol. COM-30, No. 1, January 1982, both incorporated herein by reference. In order to provide motion compensation, the pixel data for the current video frame is predicted by motion compensator 64 and motion estimator 66 from pixel data of a previous video frame stored in frame store 62. The predicted pixel data is subtracted from the actual pixel data for the current video frame at subtracter 34 to produce a set of pixel data representing a prediction error. The prediction error pixel data is presented to the first and second compression paths for compression and selection as described above.

In order to obtain a prediction for the next frame, an inverse transformation to the processing stream selected by the error evaluation and selection components must be computed, followed by the inverse of the second scan converter 42 in cases where frame processing was selected. The inverse transform is provided by circuitry 40, and the inverse of the second scan converter is provided by circuitry 54. Switch 41 is actuated by the output signal from error evaluation and selection circuit 52 to couple appropriately formatted data to the motion compensation circuitry. The appropriate inverse transform data is added back at adder 60 to the predictor signal that was initially subtracted from the incoming video. The result is written into frame store 62 (e.g., a shift register or RAM) where it is delayed until it can be used as a prediction for the next frame.

Block displacement information, indicative of the location of a previous block that best matches a current block of pixel data within a predefined area, is determined by a motion estimator 66 which inputs corresponding motion vector data (X, Y) to motion compensator 64. The motion vector data is also input to multiplexer 58 from motion estimator 66 via path 68. Multiplexer 58 appends the motion vector data to the encoded video signal for use in deriving an identical prediction signal at a receiver.

Since the object of motion compensation is to improve compression performance in moving areas of a video picture, it is more effective to estimate the block displacements and perform the compensation using fields instead of frames. Therefore, the displacement of each block of a given field is determined with reference to the same field of the previous frame. In some cases, better results are obtainable if the field immediately preceding the given field is chosen for the reference. In this case, an even field would be matched with an odd field, and an odd field would be matched with an even field. However, such a strategy is more difficult to implement and is not as effective when the vertical displacement is zero.

Motion compensation is performed in the same manner regardless of whether field processing or frame processing is chosen for encoding. A prediction is obtained for each block of a given field by utilizing the estimated displacement vector to identify the matching block in the same field of the previous frame. In cases where frame processing is chosen for encoding, the prediction errors from two different fields are eventually interleaved by the second scan converter 42.

Figure 8:
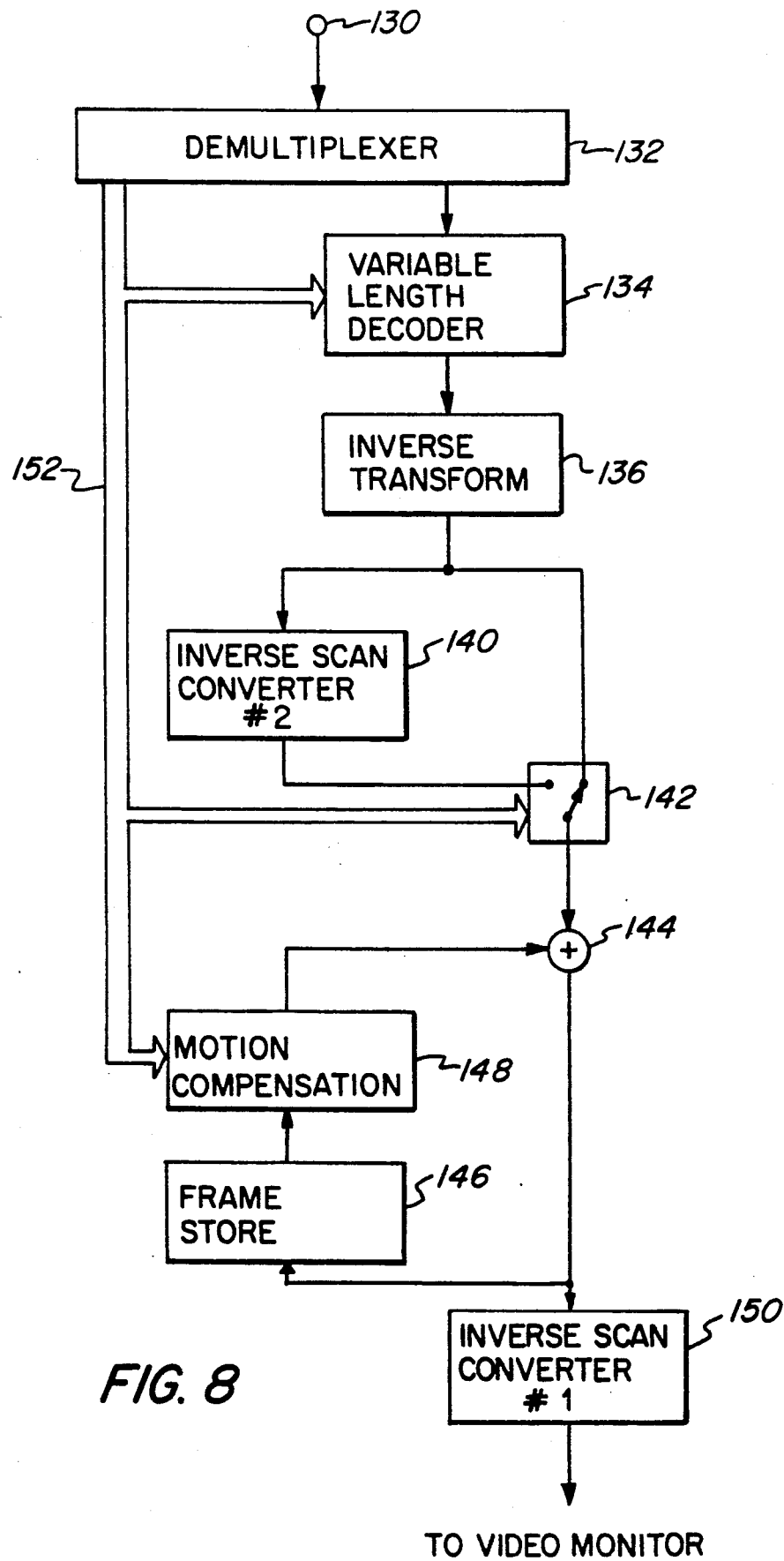
FIG. 8 is a block diagram of decoder apparatus for use at a receiver to decompress transmitted digital data and reconstruct a digitized interlaced video signal.

The compressed, encoded signals are output from multiplexer 58 to a transmitter (not shown). The transmitted signal is received by a digital television receiver, and the signals are decoded by a decoder such as that shown in FIG. 8. The received digital signals are input at terminal 130 to a demultiplexer 132 which separates the encoded control signals from the video data signals. A variable length decoder 134 recovers the quantized transform coefficients. Recovered coefficients for field processed blocks are decompressed in a first decompression path comprising inverse transform coder 136 and switch 142. Recovered coefficients for frame processed blocks are decompressed in a second decompression path comprising inverse transform coder 136, inverse scan converter 140, and switch 142. Inverse scan converter 140 is a memory device that restores the order of pixels resulting from the use of the second scan converter 42 at the encoder back to the original scanning order. The control data bit identifying each pixel data block as frame processed or field processed actuates switch 142 via path 152 to apply the appropriate decompressed data from the first decompression path or second decompression path to an inverse scan converter 150. This inverse scan converter is a memory device that restores the reordered pixels resulting from the use of the first scan converter 32 at the encoder back to the original raster scan order. The output of inverse scan converter 150 is the recovered, reconstructed digitized interlaced video signal originally input to the encoder. This output signal is coupled to a video monitor for display of the video program.

Motion compensation at the receiver is provided by frame store 146 and motion compensation circuitry 148. Motion vector data appended to blocks of pixel data at the encoder is retrieved by demultiplexer 132 at the receiver. The motion vector data is input via path 152 to motion compensation circuitry 148 which uses the data, together with data representing a previous video frame stored in frame store 146, to recompute the original prediction signals. The recomputed prediction signals are added to the decompressed blocks of pixel data for the current video frame at adder 144. Since the motion vector data computed by motion estimator 66 at the encoder is appended to the pixel data blocks, there is no need to provide motion estimation circuitry at the decoder, and the resultant decoder system is simplified.

It will now be appreciated that the present invention provides improved data compression techniques for use in digital data transmission, and particularly for use in the transmission of digital interlaced television signals. The invention may be advantageously used in the transmission of HDTV signals, and provides a means for substantially reducing the amount of data that must be transmitted to define HDTV television pictures.

A selection between frame processing and field processing based on achieving minimum error in accordance with the prevent invention has been found to be very effective in improving the picture quality of digitally compressed television signals. Still or slowly moving regions are rendered much more accurately than would be possible in a field processing system. Motion rendition is much better than would be possible in a frame processing system. Since the selection is made on a local basis, the system can adjust to scenes containing both moving and nonmoving features.

Those skilled in the art will appreciate that numerous modifications and adaptations may be made to the system described without departing from the spirit and scope of the appended claims. For example, in order to choose between frame and field processed data, block error can be evaluated in the pixel domain. In this instance, instead of comparing transform coefficients, each block of data can be inverse transformed and then compared to the original block of pixels.

We claim:

1. Apparatus for processing digitized interlaced video signals for transmission in a compressed form comprising:
   first means for compressing a set of pixel data presented in a field format to provide a first compressed video signal;
   second means for compressing said set of pixel data presented in a frame format to provide a second compressed video signal;
   means coupled to said first means for evaluating errors in the first compressed video signal and coupled to said second means for evaluating errors in the second compressed video signal; and
   means responsive to said error evaluating means for selecting the compressed video signal having the least error.

2. Apparatus in accordance with claim 1 wherein:
   successive sets of pixel data are sequentially compressed and evaluated; and
   said selecting means selects the compressed video signal having the least error for each particular set.

3. Apparatus in accordance with claim 2 further comprising:
   means for encoding the selected signals to identify them as field formatted or frame formatted signals.

4. Apparatus in accordance with claim 3 further comprising:
   means for combining the encoded selected signals to provide a compressed video signal data stream for transmission.

5. Apparatus in accordance with claim 4 further comprising:
   means for dividing a digitized interlaced video signal into even and odd blocks of pixel data corresponding to even and odd fields of a video frame; and
   means for presenting said even and odd blocks to said first compressing means in an alternating order defining said field format.

6. Apparatus in accordance with claim 5 further comprising:
   means for grouping said blocks into corresponding odd/even block pairs and scanning the odd and even lines of each pair in an alternating order to provide interleaved lines of pixel data; and
   means for presenting the interleaved lines of pixel data from successive block pairs to said second compressing means.

7. Apparatus in accordance with claim 6 wherein said sets each comprise two vertically adjacent blocks of pixel data from a video frame.

8. Apparatus in accordance with claim 1 wherein:
   said first and second compressing means produce and quantize respective first and second arrays of transform coefficients for the set of pixel data; and
   said error evaluating means determines the error between the quantized transform coefficients and the unquantized transform coefficients of each array.

9. Apparatus in accordance with claim 8 wherein:
   said error evaluating means determines said error by computing the difference between each coefficient in an array before and after quantization; and
   said selecting means compares the average error of all the coefficient differences in said first array to the average error of all the coefficient differences in said second array to identify the array having the least total error.

10. Apparatus in accordance with claim 1 wherein:
    said first compressing means produces a first array of transform coefficients for said set of pixel data;
    said second compressing means produces a second array of transform coefficients for said set of pixel data; and
    said error evaluating means comprises:
       means for inverse transforming said first and second arrays to recover the pixel data, and
       means for determining the error between the pixel data recovered from each array and the original set of pixel data presented to the first and second compressing means.

11. Apparatus in accordance with claim 1 further comprising:
    means for receiving a digitized interlaced video signal containing pixel data defining a sequence of video frames;
    means for predicting the pixel data for a current video frame from pixel data of a previous video frame;
    means for subtracting the predicted pixel data from the actual pixel data for the current video frame to produce a set of pixel data representing a prediction error;
    means for presenting the prediction error pixel data to said first compressing means in a field format; and
    means for presenting the prediction error pixel data to said second compressing means in a frame format.

12. Apparatus in accordance with claim 11 further comprising:
    means for dividing each video frame of the digitized interlaced video signal into successive blocks of pixel data for processing on a block-by-block basis by said predicting, subtracting and presenting means.

13. Apparatus in accordance with claim 11 further comprising:
    means for encoding the selected signals with motion vector data generated by said predicting means.

14. Apparatus in accordance with claim 13 further comprising:
    means for encoding the selected signals to identify them as field formatted or frame formatted signals.

15. Apparatus in accordance with claim 14 further comprising:
    means for combining the encoded selected signals to provide a compressed video signal data stream for transmission.

16. Apparatus for optimizing the compression of successive blocks of digital data comprising:
    means for compressing data blocks in a first data path to provide a first compressed signal;

means for compressing said data blocks in a second data path to provide a second compressed signal;

means for evaluating errors in the first and second compressed signals;

means responsive to said evaluating means for selecting the compressed signal having the least error for each data block; and means for combining the selected signals to provide a compressed digital data stream.

17. Apparatus in accordance with claim 16 further comprising:

means for encoding each selected signal with data indicative of the data path in which the signal originated.

18. A receiver for decoding the compressed digital data stream from the apparatus of claim 17 comprising:

means for detecting the encoding data from each selected signal to identify whether the signal originated in the first data path or the second data path; and means responsive to said detecting means for processing the selected signals from the first data path in a corresponding first decompression path and for processing the selected signals from the second data path in a corresponding second decompression path.

19. Apparatus in accordance with claim 18 wherein:

said first data path and first decompression path use a first algorithm for compression and decompression of said data blocks; and the second data path and second decompression path use a second algorithm for compression and decompression of said data blocks.

20. Apparatus in accordance with claim 16 wherein:

said data blocks are provided to said first data path in a first format and to said second data path in a second format.

21. Decoder apparatus comprising:

means for receiving compressed digital video signals transmitted in blocks of frame processed pixel data and field processed pixel data;

means coupled to said receiving means for determining whether a particular block of data contained in a received signal was frame processed or field processed;

first means for decoding received blocks of field processed pixel data;

second means for decoding received blocks of frame processed pixel data; and means responsive to said determining means for selectively combining decoded blocks from said first and second means to recover an uncompressed video signal.

22. Apparatus in accordance with claim 21 further comprising means for converting the recovered signal to a digitized interlaced video signal.

23. Apparatus in accordance with claim 21 wherein said determining means comprises means for reading field and frame processing identification data appended to said blocks.

24. Apparatus in accordance with claim 21 wherein said blocks comprise arrays of transform coefficients, and the first and second means comprise means for inverse transforming said coefficients.

25. Apparatus in accordance with claim 24 wherein the inverse transforming means is shared by said first and second means.

26. Apparatus in accordance with claim 21 further comprising:

means for retrieving motion vector data appended to received blocks of pixel data representing a current video frame;

means for storing data representing a previous video frame;

means for computing prediction signals from the retrieved motion vector data and the stored data; and means for adding said prediction signals to the received blocks for the current video frame.

27. A digital television system comprising:

first data compression means for compressing field formatted blocks of pixel data derived from a digitized interlaced video signal;

second data compression means for compressing frame formatted blocks of pixel data corresponding to said field formatted blocks;

means for evaluating errors in compressed data from said first and second data compression means;

means responsive to said error evaluating means for selecting the compressed data for each block having the least error;

means for encoding the selected data for each block to identify it as field processed or frame processed data; and means for combining the encoded selected data to provide a compressed video data stream containing interspersed blocks of field processed pixel data and frame processed pixel data for transmission by a transmitter.

28. The system of claim 27 further comprising:

receiver means for receiving said compressed video data stream from said transmitter;

means operatively associated with said receiver means for decoding the encoded selected data in said data stream to identify field processed blocks and frame processed blocks;

first means for processing received blocks of field processed data;

second means for processing received blocks of frame processed data; and means responsive to said decoding means for selectively combining blocks from said first and second processing means to recover an uncompressed digitized interlaced video signal.

29. The system of claim 28 wherein said digitized interlaced video signal defines a sequence of video frames, said system further comprising:

means for predicting the pixel data for a current video frame from pixel data of a previous video frame;

means for subtracting the predicted pixel data from the actual pixel data for the current video frame to produce a set of pixel data representing a prediction error;

means for presenting the prediction error pixel data to said first data compression means as field formatted blocks;

means for presenting the prediction error pixel data to said second data compression means as frame formatted blocks;

means operatively associated with said predicting means for generating motion vector data for the current video frame;

means operatively associated with said generating means for encoding the selected data for each block with corresponding motion vector data;

means operatively associated with said receiver means for retrieving the motion vector data from each block of a current video frame;

means operatively associated with said receiver for storing data representing a previous video frame;

means for computing prediction signals from the retrieved motion vector data and the stored data; and means for adding said prediction signals to the received blocks for the current video frame.

30. A method for encoding television signals for digital transmission comprising the steps of:

dividing a digitized interlaced video signal into blocks of pixel data;

formatting said blocks in a field format;

compressing said field formatted blocks to provide a first compressed video signal;

formatting said blocks in a frame format;

compressing said frame formatted blocks to provide a second compressed video signal;

evaluating errors in said first and second compressed video signals;

selecting, for each block, the compressed video signal having the least error;

encoding the selected signals to identify them as field formatted or frame formatted signals; and combining the encoded signals.

31. A method in accordance with claim 30 comprising the further steps of:

predicting the pixel data for a current video frame contained in said digitized interlaced signal from pixel data of a previous frame;

subtracting said predicted pixel data from the actual pixel data for the current frame to provide an abbreviated set of pixel data for use in producing said first and second compressed video signals; and encoding the selected signals with motion vector data generated during said prediction step.

32. A method for decoding the combined encoded signals produced by the method of claim 31, comprising the steps of:

decompressing field formatted signals in a decompression path adapted for field processing of data;

decompressing frame formatted signals in a decompression path adapted for frame processing of data;

retrieving the motion vector data from encoded selected signals representing a current video frame;

storing data representing a previous video frame;

computing prediction signals from the retrieved motion vector data and the stored data;

adding said prediction signals to the decompressed signals; and combining the decompressed signals to recover the digitized interlaced video signal.

33. A method for decoding the combined encoded signals produced by the method of claim 30, comprising the steps of:

decompressing field formatted signals in a decompression path adapted for field processing of data;

decompressing frame formatted signals in a decompression path adapted for frame processing of data; and combining the decompressed signals to recover the digitized interlaced video signal.

* * * * *